United States Patent

[11] 3,628,930

| [72] | Inventor | Walter William Harris<br>Toledo, Ohio |
|---|---|---|
| [21] | Appl. No. | 871,883 |
| [22] | Filed | Oct. 28, 1969 |
| [45] | Patented | Dec. 21, 1971 |
| [73] | Assignee | Johns-Manville Corporation<br>New York, N.Y. |

[54] METHOD AND APPARATUS FOR PREPARING MOLTEN MATERIAL INTO GLASS FIBERS
11 Claims, 4 Drawing Figs.

[52] U.S. Cl. .................................................. 65/2,
13/6, 18/8 SF, 65/11 R, 65/136
[51] Int. Cl. .................................................... C03b 37/00
[50] Field of Search ............................................ 65/1, 2, 11,
134, 135, 136; 18/8 SF; 13/6

[56] References Cited
UNITED STATES PATENTS

| 2,360,373 | 10/1944 | Tiede .......................... | 65/1 X |
| 3,401,536 | 9/1968 | Glaser .......................... | 65/2 X |
| 3,468,643 | 9/1969 | Stalego et al. ................ | 65/1 |
| 3,511,916 | 5/1970 | Sinclair et al. ................ | 65/2 X |

*Primary Examiner*—S. Leon Bashore
*Assistant Examiner*—Robert L. Lindsay, Jr.
*Attorneys*—John A. McKinney and Robert M. Krone

ABSTRACT: A bushing for rendering materials molten used for forming glass fibers wherein the flow pattern of material within the bushing is controlled. An internal baffel has an array of perforations in a pattern such that, when the material on one side of the baffel is cooler than that on the other side, the percentage of open area is greater in the flow path to those regions of the bushing of highest temperature than the path to those regions of lower temperature.

PATENTED DEC 21 1971
3,628,930
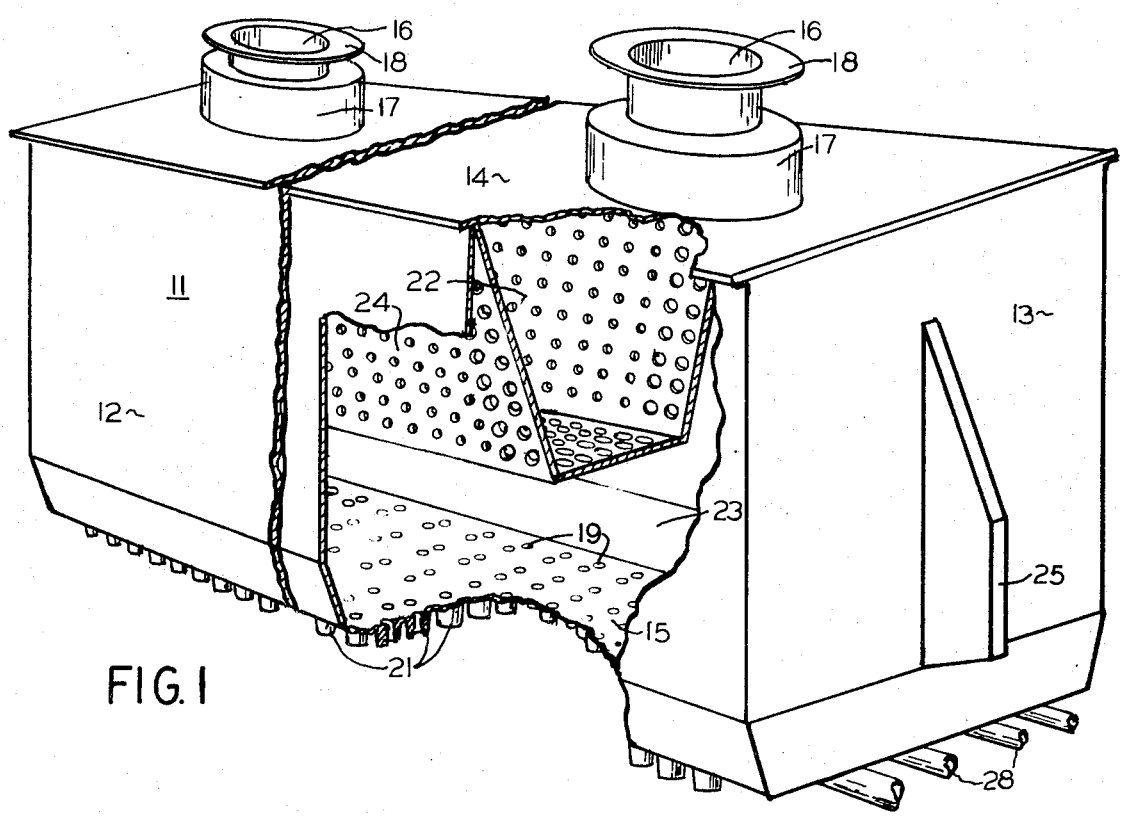
FIG. 1
FIG. 3
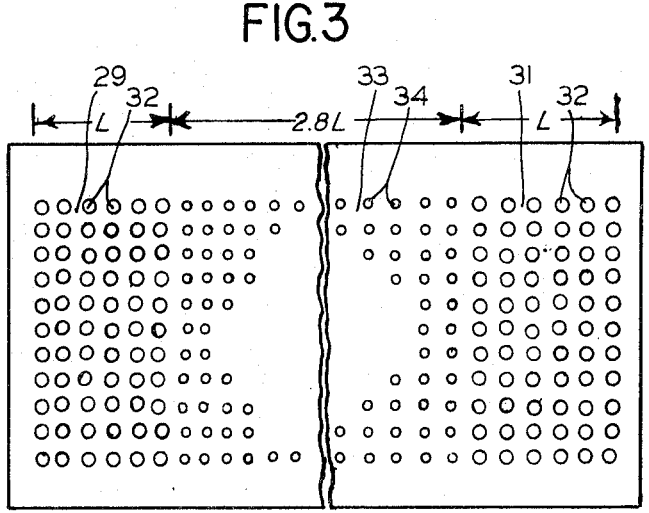
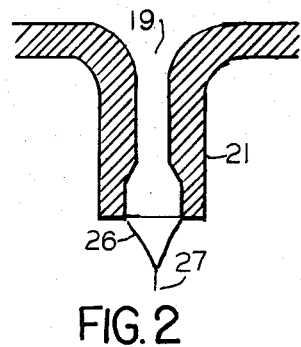
FIG. 2
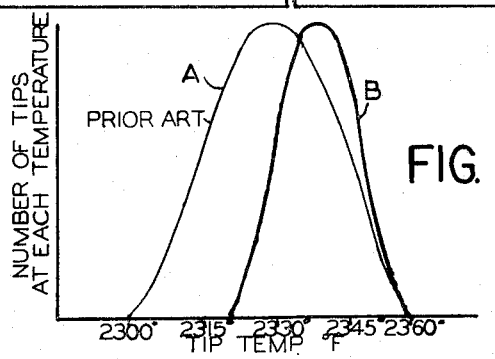
FIG. 4
INVENTOR.
WALTER WILLIAM HARRIS
BY
J. A. McKinney

METHOD AND APPARATUS FOR PREPARING MOLTEN MATERIAL INTO GLASS FIBERS

BACKGROUND OF THE INVENTION

Heretofore it has been known to produce fibers by heating material to a molten state in an electrical resistance bushing, permitting the molten material to exude from an orifice in the bottom of the bushing and then freezing the exuded molten filament. Strands of fibers have been formed by arranging an array of orifices in the bottom of a bushing and gathering the exuded filaments which may be coated with a binder or sizing and wound on a spool.

In the formation of fibers from the molten state and parameters of the process are constrained by physical factors such as the cohesion of the molten material in filament form, its surface tension in molten form, and its adhesion to the orifice walls while in molten form. Production considerations place further constraints on the process since the size of the orifice in part determines fiber diameter as does the velocity of the exuded material and the rate at which it is frozen after leaving the orifice. It has been found that temperature of the molten material and the tip having the orifice is critical in filament formation and rate of production since low temperatures tend to retard flow due to the higher viscosity of the molten material and to permit earlier freezing of the material with resultant less attenuation of the exuded material, while high temperatures increase the flow by decreasing viscosity of the molten material to the point that it impairs the required adhesion to the tip, impairs the cohesion and surface tension forces which are utilized in fiberizing the material, and can result in discontinuities in the frozen filament or excessive reduction in filament diameters. Another factor influencing the flow of material and production rates is the head on the molten material at the orifice. Ordinarily, this head is developed by the molten material depth and therefore the depth of molten material is restricted.

When an array of filaments are formed simultaneously from an array of orifices in a common bushing, the control of the processing parameters must be maintained over the entire array if the filaments produced are to be uniform. Electrical resistance type metal bushings as employed for production of filaments have exhibited temperature variations which result in variations at the orifices distributed over the bottom wall of the bushing. Such variations have been sought to be minimized by a number of expedients including the use of large cross sections including bars or rods of thermally conductive material (usually of an expensive platinum-rhodum alloy) to distribute the heat, adjustment of the wall thickness of the bushing to control the electrical resistance patterns therein and thus the heating, and external cooling means in the hotter areas with resultant loss of efficiency.

While uniformity of temperature in the bushing across the tip array has long been sought, none of the expedients have been completely satisfactory and as a result, it has been found that the effect of temperature variations has imposed a restriction upon the average temperature developed at the tips with a resultant reduction in productivity. As the number of filaments produced from an array of tips increases, the average temperature must be reduced further to maintain the hottest tips within the tolerable temperature levels. Further, the size of tip arrays are limited by the requirement that all tips be maintained within a given temperature range.

SUMMARY OF THE INVENTION

This invention relates to a method of and apparatus for increasing the uniformity of tip temperatures in a bushing from which molten material is exuded to form filaments.

An object of the invention is to increase production rates for groups of filaments derived from molten material.

Another object of the invention is to increase temperature uniformity at the orifices from which molten material is exuded.

Another object is to enable larger groups of filaments to be formed simultaneously from a bushing containing molten material.

In accordance with the above objects, a feature of the invention is to control the flow of molten material in a receptacle having an established pattern of variation in temperature through its volume whereby cooler molten material is directed to the hotter areas at a faster rate than into the cooler areas whereby a tendency to equalize temperatures is developed.

One feature of the invention resides in a baffle within the bushing between the region from which the molten material is exuded and that into which material is introduced. The baffle is apertured with an array of holes providing different percentages of open area between the two regions of the bushing. The distribution of open area is such as to tend to equalize temperatures in the region from which material is exuded. Thus, where the material in the introduction region is cooler than that in the exuding region of the bushing, the greater percentage of open area is above the hotter portion of the exuding region. Conversely if the upper region contained the hotter material and a heat loss occurs in the lower region, a greater flow would be sought to the cooler portion of the exuding region and the greater percentage of open area of baffel would be located in that flow path.

DESCRIPTION OF THE DRAWING

FIG. 1 is a perspective of a bushing typical of the type to which this invention applies with portions broken away to reveal a baffle constructed according to this invention;

FIG. 2 is a typical tip and filament forming meniscus for glass fibers;

FIG. 3 is a blank plan of a baffle according to this invention; and

FIG. 4 is a plot of distribution of tip temperatures for the prior art and the present invention.

DESCRIPTION OF THE PREFERRED EMBODIMENT

A bushing 11 of metal suitable for retaining heat softenable material, in the specific embodiment molten glass, for sustained periods at glass melting temperatures is shown in FIG. 1. This bushing, which is enclosed in a suitable mass of insulating refractory (not shown), has sidewalls 12, end walls 13, a top 14 and bottom 15. Material is admitted through suitable inlet openings 16 each of which can be a collar 17 with an upper flange 18 for connection to a suitable conduit. Filaments of molten material are exuded from the bottom 15 through suitable orifices 19 which can be defined by nozzlelike tips 21 inserted on the bottom 15 or can be formed directly in the bottom (not shown). The bushing is generally oriented with its top 14 and bottom 15 horizontal and is divided into a melting chamber 22 and a condition chamber 23 separated by a baffle.

Baffle 24 and the top, bottom, sides and ends of bushing 11 all provide heat to the contents by electrical resistance heating. Electrical connections are made to end walls 13 by means of ears or terminal lugs 25 integrally joined thereto as by welding. In order to increase the heating area presented to the glass and the enclosed volume, baffle 24 is of an inverted truncated triangular cross section and forms a basket. The lower portion of the sidewalls 12 and the bottom 15 also are of a truncated triangular cross section to concentrate heat in the vicinity of tips 21.

In the use of the bushing to form glass filaments, the region 22 above basket 24 receives solid increments of glass, which may be in the form of marbles, and retains those increments until they are rendered molten. As glass is exuded from the orifices in the bottom 15, more recently melted glass is introduced into the lower chamber 23 through apertures in the basket 24. In one form of bushing, the turnover time for glass, the interval from its admission as a solid to its exit as a filament, is about 30 minutes.

The orifices 19 and surrounding tips 21 are arrayed in closely spaced rows and columns, frequently in groups of two hundred, whereby a single bushing can have several such groups. Molten glass is exuded to form exudations at the termini of the tips 21 generally as illustrated in FIG. 2. The exudations are drawn out to form a meniscus 26 which forms into primary filaments 27 which may be attenuated into fine fibers. The illustrated tip, meniscus and attenuation to a filament is typical for glass at a tip temperature of 2300° to 2350° F. The viscosity of the glass and the surface tension and the adhesion between the glass and the tip must be maintained to form continuous filaments. These factors are function of the temperature at the tips.

External of the bushing, heat absorbing means are provided to restrict the fluidity of the filaments whereby they solidify before they are attenuated to such a degree as to break. Coolant circulating tubes 28 are positioned between the tips 21 for this purpose and are supplied with a suitable coolant such as water from a suitable source (not shown).

High rates of heat transfer from the bushing to the glass contained thereby are desirable for efficient production. At production levels, the ends of the bushings tend to be of substantially higher temperature than the intermediate portions with the result that the tips 21 exhibit a range of temperatures according to their location as shown in curve A of FIG. 4 for a prior art construction where a tolerable range of from 2300° to 2360° F. was employed with the average temperature 2330° F. The abscissa of the normal distribution curve is temperature and the ordinate is the number of tips in a 600 tip bushing operated at a melt rate of 48 pounds of glass per hour. The limiting factor in establishing the illustrative rate is the maximum temperature of 2360° F. at which satisfactory primary filaments can be formed. In practice these maximum temperatures are encountered at the ends of the bushing and they decline toward the longitudinal center over from one-fifth to one-fourth the length of the bushing to a region where a relatively constant temperature is developed with the greatest number of bushings in that region at the temperature of the peak of the curve.

In accordance with this invention, the temperature at the tip array or bottom of the bushing is made more uniform by directing a greater flow of cool molten glass into the regions of higher temperature than those of lower temperature by changing the conventional uniform pattern of openings in basket 24 wherein the percent of open area to total area is constant throughout the length of the basket to one where a greater open area percentage is presented adjacent the ends. FIG. 3 shown one structure wherein a basket 24 of 15¾ inches length having a perforated area 4⅜ inches wide is provided with end regions 29 and 31 extending about 2¾ inches along the length containing 570 holes 32 of 0.094 inch diameter for a total open area of 3.9 square inches or 31 percent open area while a center region 33 of about 8¾ inches length contiguous with the end regions contains 4176 holes 34 of 0.55 inch diameter for total open area of 9.9 square inches and a percentage of open to area of 24 percent. In this example, the total open area overall is about 26 percent.

In operation, with the basket 24 of FIG. 3 substituted for the prior uniformly perforated basket in a bushing of the form for which curve A of FIG. 4 was developed, the results plotted in curve B were obtained. Both curves were for maximum production rate and were obtained by setting the bushing control temperature at a point just below the temperature which causes streaking (hot beading) from the hot tip areas. It will be noted from curve B that the range of tip temperatures has been narrowed from 60° to 40° F. and that when the maximum temperature is set at 2360° F. the average temperature is at 2338° F. instead of the curve A 2330° F. This increased average temperature raised the production rate from 48 pounds per hour to 53 pounds per hour. In other words, the melting capacity of the bushing was significantly improved (10.4 percent by narrowing the temperature range between the cool and hot tip sections. In addition, since the diameter of the filaments attenuated from each glass cone varies as a function of the cone temperatures, the filament linear weight becomes more uniform, i.e., yardage control is more precise. Close control of yardage is a prime requirement for many applications of glass fibers, hence quality of product is improved. Bushings of 400, 600 and 800 tips have exhibited improved yardage control and melt rate when provided with baskets of the type shown in FIG. 3.

The observed improvements have been attributed to an increased rate of flow of the relatively cold molten glass above the basket through the enlarged holes into the tip regions near the ends of the bushing. This reduces the heat exposure time of the glass in the bushing ends. Therefore, the glass flowing out of the end tips is cooler. The orifice drag of the highly viscous glass against the enlarged end holes 32 of regions 32 and 31 of the basket is less than the drag of the glass against the smaller central holes 34 of region 33. This drag coefficient decreases directly with increase in hole diameter, whereas the mass rate of flow varies as the square of change in hole diameter.

Some effect may also be attributable to changes in the heat generation pattern in the bushing structure since the basket is part of that structure. The removal of material from the basket by the larger holes at the ends may change the current density and thus the heat generated in the basket.

It is to be appreciated that the basket design and hole pattern therein is merely exemplary of the invention. Variants can be applied to other bushing designs, for example: flat baffles can be employed; the transition from large to small holes can be made in a series of steps or a continuous gradation; the form of the holes can be other than circular; and the perforated baffle can be employed with bushings having other than rectangular shapes in the horizontal dimension. The size of the holes can be varied from those set forth. Where relative temperatures on opposite sides of the baffle or basket are inverted the gradations in hold size can be reversed to raise the temperature of the center section. In a bushing in which the thermal conditions are altered as by a hot spot in the vicinity of an electrical connecting lug intermediate the longitudinal ends, the basket can be provided with larger holes in the region above the hot spot than in regions above cooler portions. Thus the invention lends itself to many variations and it is to be understood that the detailed disclosure is not to be read in a limiting sense.

What I claim is:

1. A method of forming fibers from a thermoplastic fiber-forming material by conditioning the material to a uniform exuding temperature in an exudation region in the vicinity of a receptacle wall in which there is an array of orifices from which the material is to be exuded in a molten state, comprising the steps of transferring heat between the molten material and the receptacle walls in the vicinity of the exudation region, said rate of transfer varying across said region in a predetermined pattern of hotter and colder zones; establishing a temperature in the molten material in a molten material supplying region of the receptacle which is different from the desired exuding temperature for the molten material; and directing molten material from the supplying region to the several temperature zones in the exudation region at higher flow rates to the cooler zones than to the hotter zones when the material from the supplying region is hotter than that in the exudation region, and at higher flow rates to the hotter zones than to the cooler zones when the material from the supplying region is cooler than that in the exudation region, whereby heat transfer between the molten material from the supplying region and the molten material in the exudation region tends to equalize the temperature of said material in the exudation region adjacent the array of orifices in all zones.

2. The method according to claim 1 wherein the supplying region is above the exudation region, wherein the molten material in the supplying region is cooler than the molten material in the exudation region, wherein the pattern of zones is generally horizontal, and wherein material is directed downward from the supplying region above the hotter zones into the exudation region of the hotter zones at a faster rate than material is directed downward from the supplying region above the cooler zones.

3. The method according to claim 2 wherein the molten material is glass.

4. An electrical resistance type metal bushing for supplying molten material in the form of exudations to be attenuated into filaments, wherein said bushing comprises side, end and bottom walls said bottom wall having a plurality of orifices for exuding the molten material and wherein said bottom wall tends to develop zones of temperatures adjacent certain of orifices greater than the temperatures adjacent other orifices, the improvement comprising:

a baffle separating an upper portion of the bushing interior from a lower portion thereof, said baffle having at least two areas having different percentages of open area in an array providing a greater percentage of open area above the zones of greater temperature than above said other areas of said bottom wall for the passage of molten material from said upper to said lower portion.

5. A bushing according to claim 4 wherein said open areas are patterns of apertures of different size.

6. A bushing according to claim 5 wherein solid increments are introduced into said upper portion and wherein said apertures are of a size to prevent passage of said increments to said lower portion.

7. A bushing according to claim 4 wherein each end of said bushing has a zone which is hotter than the zone intermediate the ends; and wherein said baffle has an array of relatively large apertures above each end zone, and an array of relatively small apertures above the intermediate zone.

8. A bushing according to claim 7 wherein the large apertures extend across the width of the bushing and along about one-fifth of its length on each end.

9. A bushing according to claim 4 wherein said bushing has a zone at each end which tends to be hotter than the zone intermediate said end zones and wherein said end zones of said baffle have about 3.1 percent open area while said intermediate zone of said baffle has about 24 percent open area.

10 A bushing according to claim 8 wherein said large apertures are about 0.09 inch diameter and said small apertures are about 0.05 inch diameter 11. A bushing according to claim 10 wherein the total area of said large apertures in said end zones is about 31 percent of the zone area and the total area of said small apertures in said intermediate zone is about 24 percent of the zone area.

* * * * *